US012338662B2

(12) United States Patent
Szegeny

(10) Patent No.: US 12,338,662 B2
(45) Date of Patent: Jun. 24, 2025

(54) MOTOR VEHICLE LOCK

(71) Applicant: Kiekert AG, Heiligenhaus (DE)

(72) Inventor: Peter Szegeny, Engelskirchen (DE)

(73) Assignee: Kiekert AG, Heiligenhaus (DE)

( * ) Notice: Subject to any disclaimer, the term of this patent is extended or adjusted under 35 U.S.C. 154(b) by 173 days.

(21) Appl. No.: 18/002,333

(22) PCT Filed: Jul. 15, 2021

(86) PCT No.: PCT/EP2021/069865
§ 371 (c)(1),
(2) Date: Dec. 19, 2022

(87) PCT Pub. No.: WO2022/013400
PCT Pub. Date: Jan. 20, 2022

(65) Prior Publication Data

US 2023/0349202 A1 Nov. 2, 2023

(30) Foreign Application Priority Data

Jul. 15, 2020 (DE) ..................... 10 2020 118 721.1

(51) Int. Cl.
*E05B 85/26* (2014.01)
*E05B 77/34* (2014.01)
(Continued)

(52) U.S. Cl.
CPC .............. *E05B 77/34* (2013.01); *E05B 77/40* (2013.01); *E05B 81/06* (2013.01); *E05B 81/14* (2013.01);
(Continued)

(58) Field of Classification Search
CPC .......... E05B 85/26; E05B 85/02; E05B 77/34; E05B 81/06; E05B 81/34; Y10T 292/1047; Y10T 292/1082
See application file for complete search history.

(56) References Cited

U.S. PATENT DOCUMENTS 4,538,845 A * 9/1985 Yamada .................. E05B 79/08 292/216
5,678,869 A * 10/1997 Yoshikuwa ............. E05B 77/34 292/216
(Continued)

FOREIGN PATENT DOCUMENTS

DE 3934982 A1 5/1990
DE 19545722 A1 4/1997
(Continued)

OTHER PUBLICATIONS

International Search Report mailed Oct. 28, 2021, for priority International Patent Application No. PCT/EP2021/069865.

*Primary Examiner* — Carlos Lugo
(74) *Attorney, Agent, or Firm* — Renner, Otto, Boisselle & Sklar, LLP

(57) ABSTRACT

A motor vehicle lock comprising a locking mechanism having a rotary latch and at least one pawl, wherein the rotary latch can be engaged in at least one engaging position by means of the pawl, a release lever, wherein the locking mechanism can be transferred from the engaging positions into a release position by means of the release lever, and an electrical drive unit for actuating the release lever. According to the invention, the pawl and the actuation lever and the release lever are accommodated in the motor vehicle lock such that they can swivel about a central axis.

15 Claims, 1 Drawing Sheet

(51) Int. Cl.

| | |
|---|---|
| ***E05B 77/40*** | (2014.01) |
| ***E05B 81/06*** | (2014.01) |
| ***E05B 81/14*** | (2014.01) |
| ***E05B 81/30*** | (2014.01) |
| ***E05B 81/34*** | (2014.01) |
| ***E05B 85/02*** | (2014.01) |

(52) U.S. Cl.

CPC .............. *E05B 81/30* (2013.01); *E05B 81/34* (2013.01); *E05B 85/02* (2013.01); *E05B 85/26* (2013.01)

(56) References Cited

U.S. PATENT DOCUMENTS

| | | | | | |
|---|---|---|---|---|---|
| 6,003,910 | A * | 12/1999 | Dupont | E05B 81/14 | 292/216 |
| 6,232,684 | B1 * | 5/2001 | Haag | H02K 11/02 | 292/201 |
| 6,367,296 | B1 * | 4/2002 | Dupont | E05B 81/16 | 292/201 |
| 6,457,753 | B1 * | 10/2002 | Wegge | E05B 83/36 | 292/216 |
| 6,648,380 | B1 * | 11/2003 | Szablewski | E05B 81/14 | 292/216 |
| 6,705,665 | B1 | 3/2004 | Buecker et al. | | |
| 7,500,700 | B2 * | 3/2009 | Kunst | E05B 85/02 | 292/216 |
| 2005/0040656 | A1 * | 2/2005 | Taga | E05B 81/25 | 292/201 |
| 2012/0299313 | A1 | 11/2012 | Organek et al. | | |
| 2014/0175813 | A1 | 6/2014 | Margheritti et al. | | |

FOREIGN PATENT DOCUMENTS

| | | | | |
|---|---|---|---|---|
| DE | 202012103608 | U1 | 10/2012 | |
| DE | 202013004025 | U1 | 8/2014 | |
| DE | 102014106117 | A1 | 11/2015 | |
| DE | 102019109488 | A1 | 10/2020 | |
| EP | 0812972 | A2 * | 12/1997 | |
| FR | 2753738 | A1 * | 3/1998 | E05B 81/14 |
| WO | 2012116686 | A2 | 9/2012 | |

* cited by examiner

MOTOR VEHICLE LOCK

This application is a national phase of International Patent Application No. PCT/EP2021/069865 filed Jul. 15, 2021, which claims priority to German Patent Application No. 10 2020 118 721.1 filed Jul. 15, 2020, each of which is hereby incorporated herein by reference in its entirety.

FIELD OF DISCLOSURE

The invention relates to a motor vehicle lock, and in particular a motor vehicle side door lock, having a locking mechanism with a rotary latch and at least one pawl, wherein the rotary latch can be engaged in at least one engaging position by means of the pawl; a release lever, wherein the locking mechanism can be transferred from the engaging positions into a release position by means of the release lever; and an electrical drive unit for actuating the release lever, and wherein the drive unit is formed at least from an electric motor and a gear stage, and the gear stage has an actuation lever.

BACKGROUND OF DISCLOSURE

In modern motor vehicle locking systems, locking mechanisms are primarily installed which engage with one another by the rotary latch and the pawl interlocking with each other, thus enabling a fixation of a component that is movably disposed on the motor vehicle. Depending upon the arrangement in the motor vehicle, single-stage or two-stage locking mechanisms are used. While it is more common to use single-stage locking mechanisms in covers or hatchbacks, the legislators oblige the vehicle manufacturers to equip side doors with two-stage locking mechanisms. In a first step, i.e., in a first engaging position, the side door is held loosely, and in a second step, i.e., in a second engaging position, the side door is in a completely closed operating position.

In order to further increase the comfort in motor vehicles, more and more electrically-assisted functions are used in motor vehicles. In motor vehicle locking systems, electric motors are installed which then enable, for example, an electrical unlocking of the locking mechanism. The electric motor usually interacts with a transmission, wherein the gear stage then initiates an unlocking of the locking mechanism indirectly or directly. Such an electrical drive unit is known from DE 10 2019 109 488.7, for example.

DE 102019 109 488.7 discloses an electrical drive unit consisting of an electric motor with a worm gear stage downstream of the electric motor. The gear wheel of the worm gear stage is equipped with a cylindrical lateral surface which extends as a ramp about an axis of rotation of the worm gear wheel. An actuation lever is in engagement with the lateral surface, wherein the actuation lever can, for example, cause or at least initiate an unlocking of a locking mechanism. By means of this electrical drive unit, the operator of the motor vehicle can, for example, electrically unlock the motor vehicle lock so that an electrically-assisted opening of a side door can be realized.

At least the rotary latch in a motor vehicle lock is in engagement with a locking bolt or latch holder. The rotary latch and latch holder interact in such a way that the rotary latch can be pivoted around the latch holder and engages the locking mechanism by means of the pawl. The rotary latch is thus exposed to environmental influences and can, due to rain for example, come into contact with water. In order to protect the further components of the motor vehicle lock from environmental influences, it is known to subdivide the motor vehicle lock into a wet region and a dry region.

DE 20 2012 103 608 U1 discloses a motor vehicle lock in which the rotary latch is arranged in a wet region and the pawl is arranged in a dry region of the motor vehicle. Here, only a part of the pawl projects through an opening slot of the lock housing, wherein the width of the opening slot corresponds to the material thickness of the pawl. The engaging arm of the pawl is thus the part of the pawl which extends into the wet region of the motor vehicle lock for engaging with the rotary latch.

SUMMARY OF DISCLOSURE

The solutions known from the prior art have proven of value so far. However, the increasing electrification of the motor vehicle lock makes it necessary to completely separate the dry region from the region which is exposed to the environmental influences. This is where the invention comes in.

The object of the invention is to protect the electronic or electrical components of the motor vehicle lock as much as possible from environmental influences. According to the invention, an improved and structurally simple and thus cost-effective motor vehicle lock is to be provided with which environmental influences are kept away from the region of the electronics or electrical system.

The object is achieved by the features of independent claim 1. Advantageous forms of the invention are indicated in the subclaims. It should be noted that the exemplary embodiments described below are not restrictive; rather, any variation of the characteristics described in the description and subclaims is possible.

According to claim 1, the object of the invention is achieved in that the pawl and the actuation lever as well as the release lever are accommodated in the motor vehicle lock such that they can swivel about a central axis. The locking mechanism can thereby be arranged in a wet region of the motor vehicle lock, and at least a portion of the actuation mechanism for unlocking the locking mechanism can be arranged in a dry region of the motor vehicle lock. Due to the design of the motor vehicle lock according to the invention, and the possibility of functionally combining pawl, actuation lever, and release lever, it is advantageously possible to arrange the locking mechanism in the wet region and the separation to the effect that the actuation mechanism is arranged in the dry region, and a further separation between electrical drive and wet region can thereby be effected.

The actuation mechanism can, for example, consist of a release lever acting directly on the pawl and disengaging the pawl from the rotary latch. The release lever can be driven either directly via the electrical drive or by means of an actuation lever-a gear stage. The locking mechanism is located in the wet region, i.e., it is subject to the environmental influences and can come into operation due to moisture, dust, and/or temperature influences. These environmental influences must be kept away from the electronics area.

A lock housing is used for separating the wet region and the dry region, which lock housing can, on the one hand, hold and/or contain the electrical and/or electronic components, and can at the same time serve for receiving further components of the motor vehicle lock. The lock housing consists primarily of a housing part and a housing cover. Of course, the housing can also be constructed in several parts and consist of two, three, or more parts. In order to realize the concept according to the invention, it is important that at least a part of the actuation mechanism for unlocking the locking mechanism be arranged in the dry region of the lock housing.

A motor vehicle lock according to the invention is understood to also include such locks as are used in side doors, hatches, covers, or sliding doors, i.e., wherever components mounted movably on the motor vehicle must be fixed in a locking position in order to enable safe use of the motor vehicle. However, the motor vehicle lock according to the invention preferably relates to a motor vehicle side door.

The locking mechanism can be designed as a single-latch or double-latch locking mechanism. From the latest developments, locking mechanisms with rolling locking mechanism parts, such as a ball, are also known. In the case of a single-latch locking mechanism, there is only one engaging position in which the pawl holds the rotary latch. In the case of double-latch locking mechanisms, there is, in addition to a main engaging position, also a pre-engaging position, so that the rotary latch and pawl can interact in two engaging positions. The release lever thereby interacts with the locking mechanism in such a way that the release lever disengages the engaged locking mechanism. In this case, the pawl is moved out of the engagement region with the rotary latch. It is known in this case to also use several pawls. For example, when an opening torque for the locking mechanism arises in the main engaging position, the pawl can be held via a further pawl. This further pawl is then referred to as an engaging or blocking lever.

The electrical drive unit preferably consists of a DC motor, on the output shaft of which a gear wheel is mounted that interacts with a further gear wheel in order to initiate a movement in the motor vehicle lock. It is thereby conceivable that the gear wheel attached to the electric motor be in direct engagement with the release lever; however, at least one gear stage is preferably arranged between the driving gear wheel and the release lever. The preferred gear stage is a worm gear stage.

In one embodiment variant of the invention, the drive unit is formed at least from an electric motor and a gear stage, wherein the gear stage has an actuation lever. A worm which cogs with a worm gear is arranged downstream of the electric motor on the output shaft of the electric motor. The worm gear in turn drives the actuation lever. Either the pawl can be actuated directly by means of the actuation lever, or it is also conceivable that the actuation lever be in engagement with a release lever. Using an actuation lever also makes it possible to position the electrical drive and the worm gear at a distance from the locking mechanism in the motor vehicle lock. In particular, a further transmission into the drive chain can be introduced by the interaction of worm gear and actuation lever. The required force for actuating the pawl can thus be influenced or adjusted.

The actuation lever can be brought into engagement with the release lever. The release lever can preferably be connected to the actuation lever in a form-fitting manner. For this purpose, the release lever can have, for example, an opening into which the actuation lever can be inserted. Of course, it is also conceivable for the actuation lever and the release lever to be connected in a bonded and/or form-fitting and/or force-fitting manner. The actuation lever is preferably inserted into the release lever so that a torque can be introduced into the release lever by means of the actuation lever. The actuation lever is driven by the worm gear and preferably performs a pivoting movement, so that a pivoting or rotational movement is also available on the release lever, in order to release the pawl from the engagement region with the rotary latch. Worm, worm gear, actuation lever, and release lever are preferably made of plastic.

The actuation lever can be firmly connected to the release lever in order to transmit a drive power. A firm connection between actuation lever and release lever makes it possible to provide a high degree of safety when actuating the release lever. The unlocking of the locking mechanism is essential for a function of a motor vehicle lock, because otherwise a motor vehicle side door, for example, cannot be opened again. It is vital to be able to actuate the actuation chain of the electric motor via worm gear, actuation lever, and release lever at any time in order to ensure secure unlocking of the locking mechanism. Particularly in today's motor vehicles, in which an exterior door handle is in part dispensed with, the actuation chain for unlocking the locking mechanism is the primary—and in most cases the only—way to unlock the locked locking mechanism. Mechanical redundancy can then be dispensed with. A preferred embodiment of the invention results if the actuation lever extends from the dry region into the wet region in the motor vehicle lock. The motor vehicle lock is subdivided into a wet region and a dry region.

The dry region is preferably formed by a housing wall of the motor vehicle lock. In this embodiment, the locking mechanism consisting of rotary latch and pawl, as well as the release lever, are located in a wet region of the motor vehicle lock, and the actuation lever extends through the housing, thus enabling a force transmission from the electric motor to the wet region with the locking mechanism. The actuation lever thus has several functions. On the one hand, the actuation lever transmits the drive power for unlocking the locking mechanism, and, on the other, the actuation lever allows for the release mechanism and drive mechanism to be spaced apart from one another; moreover, a connection between the dry region and the wet region can be produced by means of the actuation lever.

It has been found to be particularly advantageous in this embodiment that a seal is arranged in a region of a passage opening for the actuation lever. This design according to the invention of the motor vehicle lock forms a major advantage. By using a seal in the passage region through the housing, i.e., through the connecting opening between wet region and dry region, a secure separation between wet region and dry region can be achieved. The aforementioned advantages of the actuation lever are complemented by the use of a seal, in that the advantages can be combined with the realization of a complete sealing between dry region and wet region. The actuation lever extends from the drive unit in the dry region and into the release mechanism in the wet region of the motor vehicle lock. The actuation lever extends through the plastic housing of the motor vehicle lock and serves as a transmission member in the actuation chain for unlocking the locking mechanism. If a seal is now inserted on the actuation lever and, in particular, in the region of the passage opening, secure sealing can be ensured, as a result of which a maximum degree of operational safety for the electrical drive can be provided.

It is particularly advantageous if the seal is designed as a sealing ring. The actuation lever is preferably of axially-symmetric design in the region of the passage opening and transmits the drive torque of the electric motor to the release lever or, in a different embodiment variant, to the pawl. If the seal is designed as a sealing ring, and if the actuation lever has a cylindrical shape in the region of the passage opening, this provides a structurally simple and thus cost-effective possibility for applying a seal in the motor vehicle lock. In addition to the structurally simple design, the use of a sealing ring also allows an easy assembly during the production of the motor vehicle lock.

In one embodiment variant, the seal can be mounted on the actuation lever. In addition to fastening the seal in the motor vehicle lock, i.e., for example, in a recess of the housing, it is also possible to mount, fasten, insert, and/or integrate the sealing ring directly on or into the actuation lever. This in turn offers the advantage that no further structural measures are necessary in order to arrange or hold the seal in the motor vehicle lock. This simplifies the structural design of the motor vehicle lock overall.

It has proven to be particularly advantageous if the seal can be inserted into the release lever at least in regions. If the release lever is additionally designed such that the seal extends into the release lever at least in regions, a compact design can be combined with the high advantages of being sealed. On the one hand, it is possible to ensure a secure transmission of power between the release lever and the actuation lever and, on the other, to combine a compact design with structural advantages. A high degree of impermeability between dry region and wet region, on the one hand, and, on the other, a reliable transmission of power with minimal structural installation space can thus be achieved. Moreover, by integrating the seal into the release lever, the seal can be also protected. Since the wet region is subject to environmental influences, as stated above, and the seal is made of an elastomeric plastic at least in regions and at least in the region of a sealing lip, protection for the seal can be provided by integrating the seal into a recess on the release lever.

In an alternative embodiment, the seal can be integrated, and in a bonded manner, into the motor vehicle lock. In particular, the seal can be integrated into the release lever or the actuation lever or the housing by means of a two-component, injection-molding process. A one-piece configuration of the seal with a further component of the motor vehicle lock reduces the number of assembly components, and can at the same time serve for very accurate positioning of the seal.

Overall, this results in a structurally favorable embodiment which can be combined with the advantages of tightness in the interior of the motor vehicle lock. In particular, on the one hand, a secure transmission of power in the transition between wet region and dry region and, on the other, a maximum degree of tightness can be ensured.

BRIEF DESCRIPTION OF DRAWINGS

The invention is explained in more detail below with reference to the attached drawings on the basis of a preferred exemplary embodiment. However, the principle applies that the exemplary embodiment does not limit the invention, but is merely an advantageous embodiment. The features shown can be implemented individually or in combination with further features of the description as well as the claims-individually or in combination.

In the drawings.

DETAILED DESCRIPTION

Figure 1:
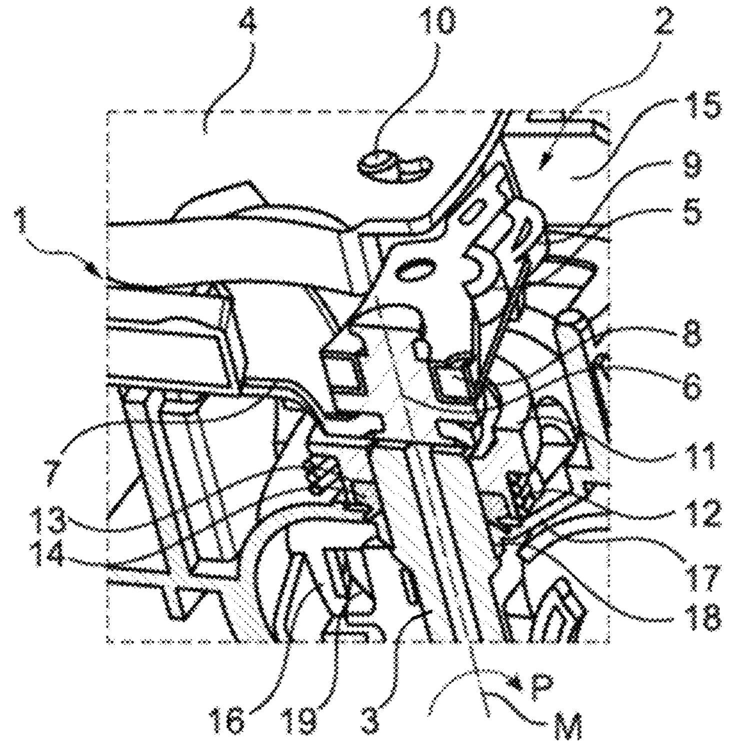
FIG. 1 shows a three-dimensional view of the actuation chain for unlocking the locking mechanism, wherein a section through the actuation lever and a pivot axis of the pawl is shown.

FIG. 1 shows a motor vehicle lock 1 in a three-dimensional view and, in the region of a locking mechanism 2, in a section through the actuation lever 3. The locking mechanism 2 comprises a rotary latch 4 and a pawl 5. The pawl 5 is supported on an axis 6, wherein the axis 6 is received on one side in a reinforcement plate 7. The axis 6 is supported on both sides, wherein, for better clarification of the invention, the lock case for the opposing bearing of the axis 6 is not shown. The pawl 5 has a metal core 8 and is provided with a plastic coating 9. The plastic coating 9 can in turn have damping properties. The pawl 5 interacts indirectly with the rotary latch 4, wherein a pivotably-mounted, rolling blocking element 10 is arranged in the rotary latch 4. The locking mechanism 2 in the form shown in FIG. 1 thus consists of the pawl axis 6, the pawl 5, the blocking element 10, and the rotary latch 4. The locking mechanism 2 can have further components.

A release lever 11 acts on the pawl 5. The release lever 11 is provided with a return spring 12 and has a recess 13 into which a seal 14 is inserted. The seal 14 itself is mounted on the actuation lever 3 and seals the wet region 1516 against the dry region 1615 in the motor vehicle lock 1. The actuation lever 3 extends from the wet region 16 into the dry region 15, wherein the actuation lever extends through the housing of the motor vehicle lock 1. The housing 17 has a passage opening 18 for this purpose. The passage opening 18 can at the same time form a bearing point for the actuation lever 3. A lever arm 19 is integrally formed on the actuation lever 3 and can be brought into engagement with a worm gear 20.

FIG. 1 shows a main engaging position of the locking mechanism 2, wherein the pawl 5 is in engagement with the rotary latch 4 and in particular with the blocking element 10. The pawl 5 is mounted in the axis 6 and held in the reinforcement plate 7 and the lock case. The pawl and actuation lever 3, as well as the release lever 11, are accommodated in the motor vehicle lock 1 so as to be pivotable about a central axis M. If the actuation lever 3 is now swiveled about the central axis M, wherein the actuation lever 3 is driven via the lever arm 19 and the electric motor, the actuation lever 3 likewise swivels the release lever 11 in a clockwise direction, in the direction of arrow P in FIG. 1. A driving contour on the release lever 11 then causes the pawl 5 to pivot about the central axis M, such that the pawl 3 and the rotary latch 4 or blocking element 10 are disengaged. In this case, the engagement between pawl 5 and rotary latch 4 is not undone, but the pawl 3 rolls on the blocking element 10 so that an easy and quiet opening can be achieved.

Figure 2:
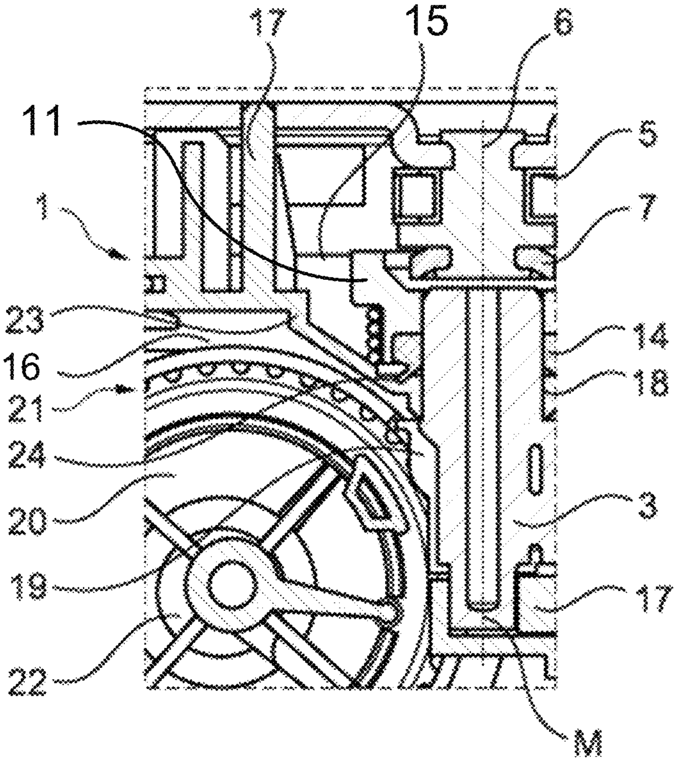
FIG. 2 shows a further view of a section through the actuation lever and the axis of the pawl, to illustrate the position and function of the seal on the actuation lever.

FIG. 2 shows a sectional view of the motor vehicle lock 1 with a view of the actuation chain 21. Shown is a section through the housing 17, the pawl 5, the axis 6, the reinforcement plate 7, the release lever 11, the seal 8, the actuation lever 3, and the worm gear wheel 22.

The actuation lever 3 is pivotably accommodated, on the one hand, in the passage opening 18 and, on the other, in the housing 17. The dry region 15 and the wet region 16 are separated by a housing wall 23, wherein the passage opening 18 is penetrated by the actuation lever 3. The position of the seal 8, which in this embodiment is accommodated in the release lever 11 and seals the passage opening 18 against the housing wall 23 by means of a sealing lip 24, can be clearly seen.

The worm gear 20 drives the actuation lever 3, wherein a contour on the worm gear 20 acts on the lever arm 19, and thus effects a pivoting of the actuation lever. The actuation lever 3 and the release lever 11 are firmly connected to one another in a form-fitting manner, so that the torque introduced into the release lever 11 by the actuation lever 3 can be used for actuating the pawl 5, and thus for unlocking the locking mechanism 2.

In any event, the solution according to the invention provides a secure means for, on the one hand, providing a structurally advantageous option for driving the release lever 11 or for unlocking the locking mechanism 2, and, on the other, a secure sealing in the motor vehicle lock can be ensured by means of the seal 14. In particular, the electrical drive or the electrical components in the motor vehicle lock 1 can thus be accommodated in the motor vehicle lock 1 so as to be protected from environmental influences.

The invention claimed is:

1. A motor vehicle lock comprising:

a locking mechanism with a rotary latch and a pawl, wherein the rotary latch is engaged in at least one engaging position by the pawl;

a release lever, wherein the locking mechanism is transferred from the at least one engaging position into a release position by the release lever disengaging the pawl from the rotary latch; and an electrical drive unit for actuating the release lever, wherein the electrical drive unit includes an electric motor and a gear stage, and the gear stage has an actuation lever, wherein:

the pawl, the actuation lever, and the release lever are arranged in the motor vehicle lock such that the pawl, the actuation lever, and the release lever swivel about a central axis, the locking mechanism is arranged in a wet region of the motor vehicle lock, the actuation lever extends in the motor vehicle lock from a dry region into the wet region and electrical components of the electrical drive unit are arranged in the dry region, and the central axis extends from the dry region into the wet region.

2. The motor vehicle lock according to claim 1, wherein the release lever acts on the pawl.

3. The motor vehicle lock according to claim 1, wherein the actuation lever is brought into engagement with the release lever.

4. The motor vehicle lock according to claim 3, wherein the release lever has an opening into which the actuation lever is inserted.

5. The motor vehicle lock according to claim 1, wherein gear stage includes a worm gear that drives the actuation lever to perform a swivel movement so that the swivel movement of the actuation lever releases the pawl from engagement with the rotary latch.

6. The motor vehicle lock according to claim 1, wherein the release lever includes a driving contour that produces a swiveling of the pawl about the central axis so that the pawl and the rotary latch disengage.

7. The motor vehicle lock according to claim 1, wherein the gear stage include a worm and a worm gear, and the worm, the worm gear, the actuation lever, and the release lever are made of plastic.

8. The motor vehicle lock according to claim 1, further comprising a housing and a seal, wherein the seal is arranged in a region of a passage opening of the housing through which the actuation lever extends.

9. The motor vehicle lock according to claim 8, wherein the seal is a sealing ring.

10. The motor vehicle lock according to claim 8, wherein the seal is mounted on the actuation lever or the release lever.

11. The motor vehicle lock according to claim 8, wherein the seal is inserted into the release lever.

12. The motor vehicle lock according to claim 8, wherein the seal is integrated into the release lever or the actuation lever or the housing by a two-component injection-molding process.

13. The motor vehicle lock according to claim 1, further comprising a lock housing that separates the wet region from the dry region, and the lock housing houses electrical components of the electric drive unit within the dry region.

14. The motor vehicle lock according to claim 13, wherein the lock housing includes an opening through which the actuation lever extends, and a seal positioned in the opening and around the actuation lever that seals the dry region from the wet region.

15. A motor vehicle lock comprising:

a locking mechanism with a rotary latch and a pawl, wherein the rotary latch is engaged in at least one engaging position by the pawl;

a release lever, wherein the locking mechanism is transferred from the at least one engaging position into a release position by the release lever disengaging the pawl from the rotary latch; and an electrical drive unit for actuating the release lever, wherein the electrical drive unit includes an electric motor and a gear stage, and the gear stage has an actuation lever, wherein the pawl, the actuation lever, and the release lever are arranged in the motor vehicle lock such that the pawl, the actuation lever, and the release lever swivel about a central axis, further comprising a housing and a seal, wherein the seal is arranged in a region of a passage opening of the housing through which the actuation lever extends, wherein the seal is inserted into the release lever.

* * * * *